United States Patent
Chen et al.

(10) Patent No.: US 11,900,272 B2
(45) Date of Patent: Feb. 13, 2024

(54) METHOD AND SYSTEM FOR MAPPING LABELS IN STANDARDIZED TABLES USING MACHINE LEARNING

(71) Applicant: FACTSET RESEARCH SYSTEM, INC., New York, NY (US)

(72) Inventors: Yan Chen, Montville, NV (US); Agrima Srivastava, Jersey City, NJ (US); Dakshina Murthy Malladi, Telangana (IN)

(73) Assignee: FACTSET RESEARCH SYSTEM INC., New York, NY (US)

( * ) Notice: Subject to any disclaimer, the term of this patent is extended or adjusted under 35 U.S.C. 154(b) by 220 days.

(21) Appl. No.: 15/930,702

(22) Filed: May 13, 2020

(65) Prior Publication Data

US 2021/0357775 A1  Nov. 18, 2021

(51) Int. Cl.
*G06F 16/30* (2019.01)
*G06N 5/04* (2023.01)
*G06F 16/25* (2019.01)
*G06N 20/00* (2019.01)

(52) U.S. Cl.
CPC ............ *G06N 5/04* (2013.01); *G06F 16/258* (2019.01); *G06N 20/00* (2019.01)

(58) Field of Classification Search
CPC ..................................................... G06F 16/27
See application file for complete search history.

(56) References Cited

U.S. PATENT DOCUMENTS

| | | | |
|---|---|---|---|
| 9,646,226 B2 | 5/2017 | Wang et al. | |
| 10,621,509 B2 | 4/2020 | Kurata | |
| 2012/0310868 A1* | 12/2012 | Martins | G06F 16/313 706/12 |
| 2016/0019197 A1* | 1/2016 | Iasi | G06F 40/174 715/224 |
| 2018/0189560 A1* | 7/2018 | Chen | G06V 30/416 |
| 2018/0285982 A1* | 10/2018 | Pai | G06Q 40/12 |
| 2019/0354552 A1 | 11/2019 | Maharajh et al. | |
| 2021/0232908 A1* | 7/2021 | Xian | G06N 3/08 |
| 2022/0309813 A1* | 9/2022 | Melchy | G06N 3/045 |

FOREIGN PATENT DOCUMENTS

| | | |
|---|---|---|
| WO | 2007149623 A3 | 12/2007 |
| WO | 2019060454 A2 | 3/2019 |
| WO | 2019113122 A1 | 6/2019 |

OTHER PUBLICATIONS

International Search Report and Written Opinion dated Aug. 10, 2021 issued for PCT/US2021/031223.

* cited by examiner

*Primary Examiner* — Khanh B Pham
(74) *Attorney, Agent, or Firm* — Hunton Andrews Kurth LLP

(57) ABSTRACT

A method and system for mapping labels of documents is described. A training set including a plurality of documents and at least one map can be retrieved. Each document can include a plurality of labels, and the at least one map can represent associations between the labels of one document and another document in the set. Each document (or group of documents) in the set can include certain features. These features can relate to the labels in the documents. Each label can correspond to one or more data points (or datasets) in each documents. In one example embodiment, the map can be generated based on the features extracted from each document.

14 Claims, 2 Drawing Sheets

METHOD AND SYSTEM FOR MAPPING LABELS IN STANDARDIZED TABLES USING MACHINE LEARNING

BACKGROUND

Optical character recognition ("OCR") is the electronic conversion of images of typed, handwritten or printed text into machine-encoded text, whether from a scanned document or a photo of a document. Using OCR technology, one can scan older documents and create a digital record of these documents. These digital records can include machine-encoded text which can be accessible by computer programs.

Machine learning uses statistical techniques for teaching computers with data to perform specific tasks without being explicitly programmed to do so. The goal of machine learning is to construct algorithms that can learn from and make predictions on data. These algorithms work by creating mathematical models which can classify data. The process of creating the models can involve training and fine tuning the model parameters using input data.

SUMMARY

These days most documents (and statements) are generated electronically. Hence, it is fairly easy for analysts and researchers to access any data included in these documents for research, analysis or other purposes. Specifically, one can use a computer program to extract the data and store it in a manner that can be used by other programs for further analysis. However, not all documents are electronic documents. For example, older documents were generally created in paper format, and in some instances, old data can be found only in paper documents. As an example, older financial statements for many companies are still available only in paper format. Yet a detailed study of a company's business behavior might require access to the company's older financial statements. As another example, almost all the documents detailing demographic data pertaining to the populations of developing countries were created in paper format, and research topics dealing with these subjects might require conversion of the paper documents to electronic files.

Because some applications or research topics require an analysis of the present and past data, researchers and analysts have started converting these paper documents into electronic format. As part of the process for digitization of these documents, various OCR techniques can be implemented to convert the data into machine-encoded text (i.e., a computer accessible format). Once the data is converted into machine-encoded text, a computer program can analyze the data. For example, for a table including data, the computer program can detect a label for each set of data (or data points) in the table. The computer program can extract the data and the label associated with it. The computer program can also extract and aggregate additional sets of data from other documents (e.g., older documents). Once the data is aggregated, the computer program can evaluate the data and detect trends and patterns. This technique assumes that the data is consistently labeled, i.e., a type of data referring to a specific concept or phenomena is always labeled the same in all documents.

However, one recurring problem in this area is the inconsistency of data labelling over time. In other words, labels relating to the same concepts or phenomena (i.e., semantically similar labels) may or may not remain the same syntactically, i.e., the label for a particular type of data can change over time. For example, in the context of financial statements for a company, the financial label "net property, plant and equipment" might have been reported as "net plant, rental machines and other property" in the past. This problem is not limited to paper documents, and in fact, change in labels can also happen in electronic documents. In order to evaluate older documents and data, one needs a map connecting all the labels.

Several techniques have been proposed for addressing issues relating the above described problems. For example, Latent Semantic Analysis ("LSA") is an extensively used analysis for similar situations. However, LSA is more appropriate for longer texts and LSA results in sparse representations for shorter sentences. Some propose using distance functions in this context. Distance functions have been used to make similarity measures for clustering. However, the effectiveness of these measures in clustering the text documents have been questioned. Others propose a normalized and modified version of the Longest Common Subsequence ("LCS") string matching algorithm in order to measure the text similarity. However, financial labels (and labels in general) are too scarce as a unit to support effective statistical analysis.

Therefore, it is an object of this disclosure to describe an efficient, scalable and intelligent mapping technique that can use machine learning to generate a map demonstrating associations between labels used in a plurality of documents. It is also an object of this disclosure to propose a feature-based approach in order to find semantic similarities between the labels.

Accordingly, a method and system for mapping labels of chronologically relevant documents is described. In an example embodiment, a training set including a plurality of documents and at least one map can be retrieved. Each document can include a plurality of labels, and the at least one map can represent associations between the labels of one document and another document in the set. Each document (or group of documents) in the set can include certain features. These features can relate to the labels in the documents. Each label can correspond to one or more data points (or datasets) in each documents. In one example embodiment, the map can be generated based on the features extracted from each document.

In an example embodiment, various features of the documents can be extracted. For example, various similarity features relating to the labels can be extracted, e.g., cosine similarity, context similarity, Jaccard similarity or other features can be extracted from all possible pairs of labels (i.e., one label from a first document in the set and another label from a second document in the set).

In an example embodiment, a machine learning model (or classification model) can be trained using the extracted features and the at least one map. Once the classification model is trained, a new set of documents can be fed to the model. Various features of the new set of documents can be extracted. Each of the new documents can include a plurality of labels. The model can analyze the new set of documents and return at least one map including associations between the labels of the documents. In one embodiment, the model can return the mapping which has the highest prediction score.

Prior to extracting the features from the training set of documents, in one example embodiment, one or more of the documents can be converted into a specific format, e.g., XML. In an example embodiment, as an optional step, all the tables in the documents can be identified and marked prior to extracting the features. In one embodiment, the new set of documents can also be converted into the specific format, e.g., XML, and all the tables in the new set of documents can be identified.

DETAILED DESCRIPTION

Training Set

Figure 1:
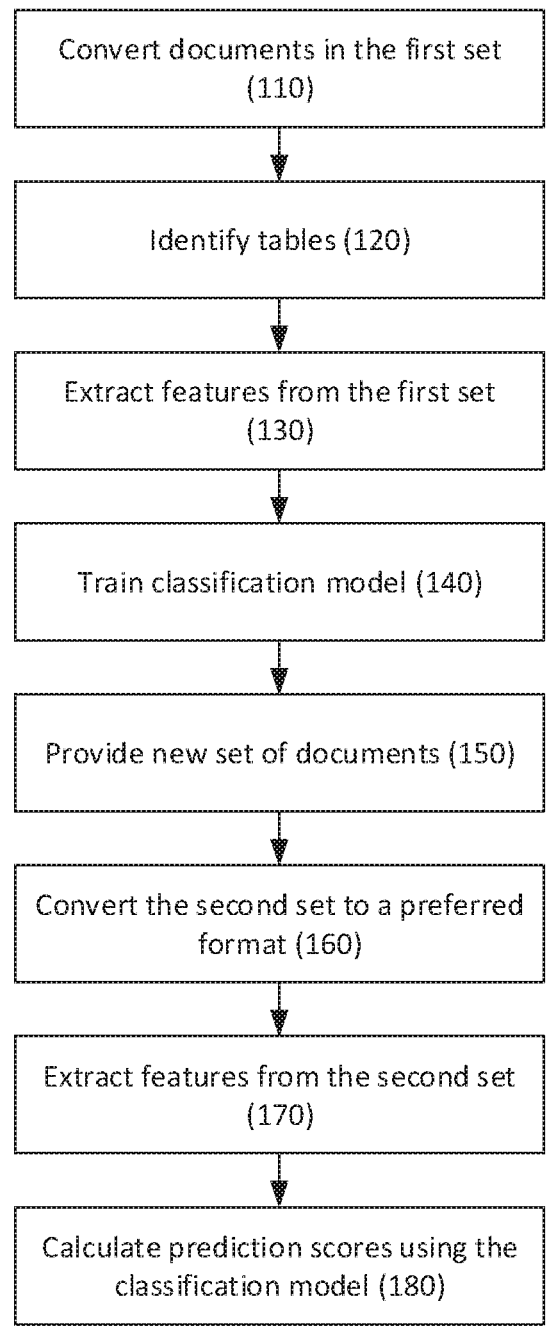
FIG. 1 shows an example flow chart for creating a map explaining associations between various labels in a set of documents.

In an example embodiment, a training set can be generated. The training set can include a plurality of documents and at least one map representing associations between the labels in the documents. All the documents in the training set can include the same type of data, e.g., all can be annual financial statements for a particular company. The documents can include at least one label for a particular type of data. The label might not be the same in all the documents and there can be naming variations for the same type of data.

For example, the training set can include the annual financial statements of a company. The 2019 financial statement can include a set of data labeled as "net property, plant and equipment." The financial statements for years 2010-18 can also include the same type of data. However, the labeling convention for this type of data changed in 2015. As such, the 2015-19 statements can include the same label (i.e., "net property, plant and equipment"), but the 2010-14 statements can include a different label for the same type of data, e.g., "net plant, rental machines and other property."

As another example, for an annual census reports, the 2010 census report can include a set of data labeled as "Young Population" and the 2011-19 census reports can also include the same type of data. However, the labeling convention for the census report changed in 2015. As such, this type of data is labeled as "Young Population" in the 2010-14 reports, but the same type of data is labeled as "First Age Group" in the 2015-2019 census reports.

The at least one map can define associations between the labels of the documents included in the training set. For example, for the financial statements, the at least one map can define that the label "net property, plant and equipment" in 2015-19 statements is related to the label "net plant, rental machines and other property" in the 2010-14 statements, or that there is a very high likelihood that these labels are associated. Similarly, for the census reports, the at least one map can define that the label "Young Population" in years 2010-14 is related to the label "First Age Group" in years 2015-19.

In one example embodiment, the documents in the training set can include data reported in a plurality of formats, e.g., a first document can report the data in a first format and a second document can report the data in a second format. In this example embodiment, the map can include a plurality of sub-maps, i.e., one sub-map for each pair of document formats. For example, a training set can include a collection of financial statements for several hundreds of companies. The training documents can report financial data in the eXtensible Business Reporting Language (XBRL) format as well as HyperText Markup Language (HTML) format, e.g., the data can be reported in HTML format for years 2010-15, but can be reported in XBRL format for years 2016-2019. In this example, there can be three sub-maps showing associations for the labels, i.e., a sub-map for XBRL to XBRL documents, a sub-map for XBRL to HTML documents and a sub-map for HTML to HTML documents.

Feature Extraction

Feature extraction can involve reducing the amount of resources required to describe a large set of data. For example, feature extraction can start from an initial set of measured data and build features intended to be informative and non-redundant, thereby facilitating the subsequent learning and generalization steps for machine learning. Feature extraction can be a dimensionality reduction process, where an initial set of raw variables is reduced to more manageable groups or features for processing, while still accurately and completely describing the original data set.

In one example embodiment, certain features of the documents can be extracted to facilitate the machine learning process. The machine learning model will by trained to make predictions based on the extracted features. In some embodiments one may extract as few features as possible to simplify the training process, but at the same time, extract the most important features of the document to make the predictions precise.

In one example embodiment, a set of similarity metrics can be used as features, e.g., for feature extraction, one can calculate the cosine similarity, context similarity, bi-gram similarity and tri-gram similarity for the labels in the documents. For example, in a training set, some of the documents can include the label "net property, plant and equipment," but other ones can include the label "net plant, rental machines and other property." One feature of the training set with these documents is the similarity between these labels. As such, in the feature extraction step, one may calculate, e.g., a cosine similarity or Jaccard similarity for these two labels (or their respective vectors) and/or other labels in the documents and use these similarity metrics as one or more features for prediction. More specifically, one can calculate similarity metrics for all or some pairs of labels in the documents, and use the pair (or pairs) with the highest or relatively higher similarity score as a feature (or features) of the document.

In one example, cosine similarity can be calculated for two labels, e.g., (label 1 and label 2). In one example, a hierarchy based cosine similarity can be calculated. For example, for a label 1 with parent 1 and label 2 and parent 2, the cosine similarity can be calculated for (label 1, parent 1, label 2 and parent 2). In one example, a context similarity can be calculated. For example, context similarity can be calculated by taking the fraction of total count of overlaps between the two labels to the length of the first label. In one example, hierarchy based bi-gram similarity can be calculated. This can be similar to hierarchy based cosine similarity but instead of considering single words or unigrams, bigram considers the pairs of words, e.g., (label 1, parent 2), (label 2, parent 1), (parent 1, parent 2), etc. In one example, hierarchy based trigram similarity can be calculated. This is similar to hierarchy based cosine similarity but instead of considering single words or unigrams, trigram considers triple words as a set in order to calculate similarity, e.g., (label 1, parent 1, label 2), (label 1, label 2, parent 2), etc.

In an example embodiment, a hierarchy of labels can be important for mapping the labels. If two labels have the same parent, it is more likely that the labels are associated. For example, the accounting label "Expenses" can be the parent label for the accounting label "Depreciation Expense." If the label "Asset Expense" has the same parent (e.g., in a different document), it is more likely that "Depreciation Expense" is associated with "Asset Expenses." Thus, a machine learning model may consider parent labels in making a prediction. In one example, the parent labels can be extracted as a feature. In one example, a similarity of parents of two labels can be used as a feature. As such, the similarity metric may be calculated for parents of labels. For example, a cosine similarity or context similarity may be used for parents of two labels as a feature of the training set.

In an example embodiment, the recap data can be used as a feature for extraction. Certain documents or reports can include a recap section. For example, in financial statements, a company always reports the data for the previous year along with the data for the current year. This data is called recap data. A label in the recap data can be matched with a label from another document, and if the labels match (or the degree to which the labels match exceeds a threshold), recap data can be used as a feature.

In one example embodiment, a similarity of relative positions of two labels can be used as a feature of the training set. For example, if two labels both appears on row 33 of two different documents, it is likely that they are associated. In one example embodiment, the labels surrounding a particular label can be used as a feature for extraction. For example, the labels above and below a label can be considered when extracting the features. If two labels have the same labels above and below them, they are likely related. In one example embodiment, the number of words in a label may be considered as a feature. For example, "Depreciation Expense" and "Asset Expense" both have two words, and thus, they are likely related.

Model Training

In an example embodiment, the training set, i.e., the documents, the at least one map associated with the documents and the extracted features, can be used to train a machine learning model (or classification model).

In one embodiment, the training technique can include an ensemble technique called stacking. Stacking is an ensemble learning technique that combines multiple classification or regression models via a meta-classifier or a meta-regressor. The base level models (i.e., the classification or regression models) are trained based on a complete training set. Subsequently, the meta-model is trained on the outputs of the base level models as features. For example, in stacking, three different models, i.e., the logistic regression, support vector machines and random forest, can be used for training. The output from these models, respectively, can act as the feature set for the final model which can be trained using the support vector machine algorithm.

Using the Model to Predict Label Maps

In an example embodiment, after training the machine learning model (or classification model), a new set of documents can be fed to the model and the model can predict a map defining various associations between the labels in the documents.

In one example embodiment, prior to feeding the new set of documents to the model, certain features of the documents can be extracted. For example, various similarity metrics can be calculated and extracted for various pairs of labels within the new set. These features can be provided to the model for making the predictions.

In response to receiving the new set of documents and the extracted features, the model can output certain mapping scores. The mapping scores indicate the likelihood that two labels can be associated with each other. The higher the mapping score for a pair of labels, the more likely that the labels are related. Using the prediction scores, one can generate a map, which represents associations between various labels in the new set of documents. For example, the map can include a set of groups of labels, each group including a plurality of labels which have the highest prediction score for being associated with each other. Using the map, one may extract a particular type of data from a set of documents which span over a period of time, e.g., the documents can include changes in labelling conventions.

Example Embodiment

FIG. 1 shows an example flow chart 100 for creating a map explaining associations between various labels in a set of documents. In this example embodiment, in a step 110, a first set of documents can be converted into a preferable format. For example, the first set of documents can be converted from PDF to XML. In a step 120, all tables in the first set of documents can be identified.

In a step 130, various features of the first set of documents can be extracted. For example, cosine similarity can be calculated for two labels. As another example, a cosine similarity can be calculated for two labels and their respective parents, e.g., cosine similarity is calculated for label 1 and parent 1, and label 2 and parent 2. As another example, context similarity can be calculated for two labels. As another example, a hierarchy based cosine similarity can be calculated. In step 140, a classification model can be trained using the first set of documents, a map displaying various associations between the labels in the first set of documents and the features extracted.

Subsequently, in step 150, a new set of documents, e.g., the second set of documents, can be provided. In step 160, the second set of documents can be converted into a preferred format, if conversion is needed. In step 170, various features of the second set of documents can be extracted. In step 180, the second set of documents and the extracted features can be provided to the classification model, and the classification model can make a prediction about various label associations in the second set of documents.

Technical Implementation of a Server

Figure 2:
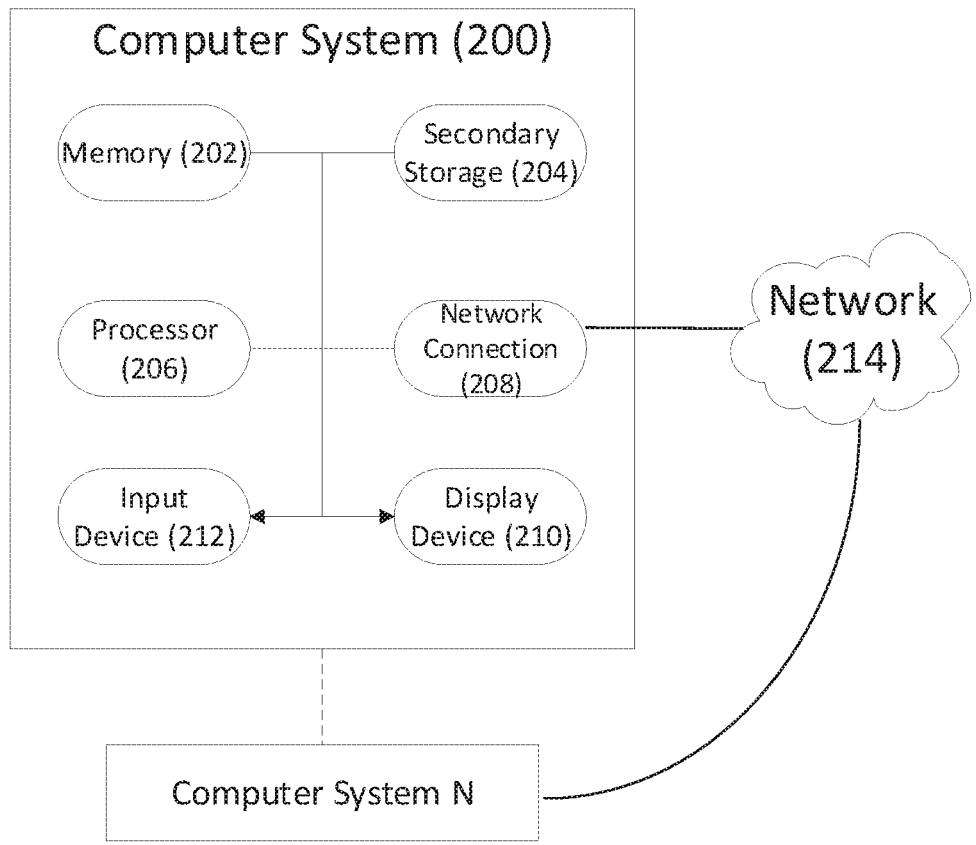
FIG. 2 illustrates exemplary hardware components for a processing unit implementing the example flow chart.

FIG. 2 illustrates exemplary hardware components of a server capable of performing the steps of the flow chart displayed in FIG. 1. A computer system 200, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 200, may run an application (or software) and perform the steps and functionalities described above. Computer system 200 may connect to a network 214, e.g., Internet, or other network, to receive inquires, obtain data, and transmit information and incentives as described above.

The computer system 200 typically includes a memory 202, a secondary storage device 204, and a processor 206. The computer system 200 may also include a plurality of processors 206 and be configured as a plurality of, e.g., bladed servers, or other known server configurations. The computer system 200 may also include a network connection device 208, a display device 210, and an input device 212.

The memory 202 may include RAM or similar types of memory, and it may store one or more applications for execution by processor 206. Secondary storage device 204 may include a hard disk drive, floppy disk drive, CD-ROM drive, or other types of non-volatile data storage. Processor 206 executes the application(s), such as those described herein, which are stored in memory 202 or secondary storage 204, or received from the Internet or other network 214. The processing by processor 206 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 200 may store one or more database structures in the secondary storage 204, for example, for storing and maintaining the information necessary to perform the above-described functions. Alternatively, such information may be in storage devices separate from these components.

Also, as noted, processor 206 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 200.

The input device 212 may include any device for entering information into the computer system 200, such as a touchscreen, keyboard, mouse, cursor-control device, microphone, digital camera, video recorder or camcorder. The input and output device 212 may be used to enter information into GUIs during performance of the methods described above. The display device 210 may include any type of device for presenting visual information such as, for example, a computer monitor or flat-screen display (or mobile device screen). The display device 210 may display the GUIs and/or output from sub-system components (or software).

Examples of the computer system 200 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 200 is shown in detail, system 200 may use multiple computer systems or servers as necessary or desired to support the users and may also use back-up or redundant servers to prevent network downtime in the event of a failure of a particular server. In addition, although computer system 200 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 200, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A method comprising:
   receiving a training set of documents, each document including a plurality of first labels associated with first data points, wherein each document displays the plurality of first labels and the first data points in a table;
   receiving a map demonstrating associations between respective first labels of the documents;
   extracting a first feature of each document in the training set, wherein the first feature is a similarity of a first position of at least one of the plurality of first labels in a first document to a second position of at least one of the plurality of first labels in a second document;
   extracting a second feature of each document in the training set, wherein the second feature is another similarity of at least one of the plurality of first labels appearing before or after at least another one of the plurality of first labels in the first document to at least one of the plurality of first labels appearing before or after at least another one of the plurality of first labels in the second document;
   training a classification model using the training set of documents, the map, the first feature, and the second feature;
   receiving a second set of documents, each document including a plurality of second labels associated with second data points;
   extracting a third feature of each document in the second set;
   providing the second set of documents and the third feature to the classification model; and
   receiving a prediction score from the classification model, the prediction score indicating a likelihood of two second labels being associated with each other.

2. The method of claim 1, further comprising generating a map based on the prediction score.

3. The method of claim 1, further comprising converting the first set of documents to another format, the other format being an XML format.

4. The method of claim 1, further comprising converting the second set of documents to another format, the other format being an XML format.

5. The method of claim 1, wherein training the classification model includes a stacking technique.

6. The method of claim 5, wherein the stacking technique combines multiple classification or regression models via a meta-classifier or a meta-regressor.

7. The method of claim 6, wherein the meta-classifier or the meta-regressor is trained on outputs of base level models as features.

8. The method of claim 5, wherein base level models are trained based on a complete training set.

9. The method of claim 1, further comprising extracting a third feature of each document in the training set.

10. The method of claim 9, wherein the third feature is cosine similarity, context similarity, bi-gram similarity and/or tri-gram similarity.

11. The method of claim 9, wherein the second third feature is a hierarchy of a label.

12. The method of claim 9, wherein the third feature is recap data.

13. The method of claim 9, wherein the third feature is a similarity of labels appearing before or after a label.

14. The method of claim 9, wherein the third feature is a number of words in a label.

* * * * *